US012567730B2

(12) United States Patent
Barkan

(10) Patent No.: US 12,567,730 B2
(45) Date of Patent: Mar. 3, 2026

(54) MODULAR CHARGING CABLE SUPPORT ARM

(71) Applicant: BARKAN MOUNTS LTD, Tel Aviv (IL)

(72) Inventor: Lior Barkan, Tel-Aviv (IL)

(73) Assignee: BARKAN MOUNTS LTD, Tel Aviv (IL)

( * ) Notice: Subject to any disclaimer, the term of this patent is extended or adjusted under 35 U.S.C. 154(b) by 19 days.

(21) Appl. No.: 18/793,974

(22) Filed: Aug. 5, 2024

(65) Prior Publication Data

US 2026/0039101 A1 Feb. 5, 2026

(51) Int. Cl.
B60L 53/18 (2019.01)
H02G 11/00 (2006.01)
(52) U.S. Cl.
CPC .............. H02G 11/00 (2013.01); B60L 53/18 (2019.02)
(58) Field of Classification Search
CPC ................................ H02G 11/00; B60L 53/18
See application file for complete search history.

(56) References Cited

U.S. PATENT DOCUMENTS

2007/0148992 A1* 6/2007 Sato ................... B60R 16/0207
439/34
2011/0074351 A1 3/2011 Bianco et al.

2015/0060611 A1* 3/2015 Takahashi ............... B60L 50/00
248/70
2019/0214807 A1 7/2019 Owens
2020/0369167 A1* 11/2020 Krucinski ............. H02J 7/0042
2024/0010083 A1 1/2024 Pirie et al.
2024/0067016 A1 2/2024 Reyes et al.
2024/0131944 A1 4/2024 Lamore
2024/0326721 A1* 10/2024 Kogure .................... H02G 3/04

FOREIGN PATENT DOCUMENTS

EP 3459785 3/2019
GB 2624242 5/2024

* cited by examiner

*Primary Examiner* — Amy J. Sterling
(74) *Attorney, Agent, or Firm* — SOROKER AGMON NORDMAN RIBA

(57) ABSTRACT

A modular cable support arm system, including two or more rigid units to form an arm to hold an electric charging cable, a wall mount hinge to rotatably attach a first rigid unit to a wall, a handle connector connected to a last rigid unit to attach a handle support to guide the arm to a desired location and hold a charging handle of the electric charging cable when not in use, one or more connectors connecting the two or more rigid units together sequentially to form the arm; and wherein at least one of the two or more rigid units are U shaped having an opening facing downward to conceal the electric charging cable within the rigid unit and to hold the electric charging cable so that the electric charging cable does not need to be dismantled and inserted into the arm to be held by the arm.

16 Claims, 9 Drawing Sheets

470

174

470

MODULAR CHARGING CABLE SUPPORT ARM

FIELD OF THE DISCLOSURE

The present disclosure relates to a system and method of supporting a charging cable and more specifically to a self constructable modular arm for supporting the charging cable.

BACKGROUND OF THE DISCLOSURE

Electric cars are becoming more and more common. Thus there is a high demand for charging stations. Typically, a charging station includes a lengthy cable, for example 5-10 meters that generally dangles on the floor. The cable is likely to become a security hazard to people passing by, who may trip over the cable or get tangled up with it. Likewise, the dangling cable is prone to be damaged by people and vehicles or other devices that may trod on the cable when passing by. If the cable is torn there is also a risk of electrocution due to the electrical power provide by the cable.

Some charging stations hang the cable in the air from a pole that is located in the vicinity of the charging station or hold the cable with the help of a beam or arms that extend from the charging station or are located near the charging station, to prevent the cable from dangling on the ground. Generally such solution can be very large, and bulky and require a professional installer to transport and install the pole or beam thus making installation very expensive in labor and transportation. Likewise if changes to the length of the supporting arm are required the entire arm or beam may need to be dismantled and replaced.

It is thus desirable to design a user constructable modular arm for supporting a charging cable. The modular arm would be constructed from small units so that the user may select a desired size for the constructed arm and low-cost transportation.

SUMMARY OF THE DISCLOSURE

An aspect of an embodiment of the disclosure, relates to a modular cable support arm system for holding an electrical cable of a vehicle charging system in the air above the vehicle. The support arm system enables inserting the charging handle into the vehicle's charging socket while holding the cable above the vehicle keeping it out of harms way, so that the cable is not damaged and people do not trip over the cable.

There is thus provided according to an embodiment of the disclosure, a modular cable support arm system, comprising:

Two or more rigid units to form an arm to hold an electric charging cable;

A wall mount hinge to rotatably attach a first rigid unit to a wall;

A handle connector connected to a last rigid unit to attach a handle support to guide the arm to a desired location and hold a charging handle of the electric charging cable when not in use;

One or more connectors connecting the two or more rigid units together sequentially to form the arm;

Wherein at least one of the two or more rigid units are U shaped having an opening facing downward to conceal the electric charging cable within the rigid unit and to hold the electric charging cable so that the electric charging cable does not need to be dismantled and inserted into the arm to be held by the arm.

In an embodiment of the disclosure, at least one connector of the one or more connectors connects two rigid units together non-rotatably to form an elongated rigid unit. Optionally, a bolt, screw, dowel, wire or other element is inserted in U shaped rigid units to hold the electric charging cable within the rigid unit and prevent the electric charging cable from falling.

In an embodiment of the disclosure, reinforcing units are used to seal the opening of U shaped rigid units to enhance their strength and prevent the electric charging cable from falling. Optionally, the handle support comprises a hand grasp to guide the arm to a desired location, a socket to hold the charging handle when not in use and a hook to hang a roll of excess cable of the electric charging cable. Optionally, the arm comprises two sequences of rigid units between the wall mount hinge and the handle connector. In an embodiment of the disclosure, the two sequences are parallel to each other. Alternatively, the two sequences tilt at an angle relative to each other.

In an embodiment of the disclosure, the arm comprises two sequences of rigid units from the wall mount hinge to one of the one or more connectors and a single sequence from the one of the one or more connectors to the handle connector. Optionally, the single sequence is rotatably connected to the two sequences.

In an embodiment of the disclosure, some of the one or more connectors are welded to one of the rigid units that are connected by the connector. Optionally, the system is provided as a kit with a specific amount of rigid units and connectors to form specific arm configurations.

In an embodiment of the disclosure, some of the two or more rigid units have a cross section that is rectangular shaped. Optionally, the length of the two or more rigid units are less than 45 centimeters to reduce shipping costs.

In an embodiment of the disclosure, the arm includes at least two parts that are rotatably connected and each of the two parts includes a sequence of two rigid units that are non-rotatably connected. Optionally, the arm includes at least two parts that are rotatably connected and each of the two parts includes a sequence of three or four rigid units that are non-rotatably connected.

There is further provided according to an embodiment of the disclosure, a method of preparing a cable arm support, comprising:

Mounting a wall mount hinge onto a wall;

Rotatably attaching a first rigid unit of two or more rigid units to the wall mount hinge;

Attaching a connector of one or more connectors to the first rigid unit to attach an additional rigid unit to form an arm to hold an electric charging cable;

Repeatedly attaching additional connectors and rigid units to form an arm of a selected length;

Connecting a handle connector to a last rigid unit to attach a handle support to guide the arm to a desired location and hold a charging handle of the electric charging cable when not in use;

Wherein at least one of the two or more rigid units are U shaped having an opening facing downward to conceal the electric charging cable within the rigid unit and to hold the electric charging cable so that the electric charging cable does not need to be dismantled and inserted into the arm to be held by the arm.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
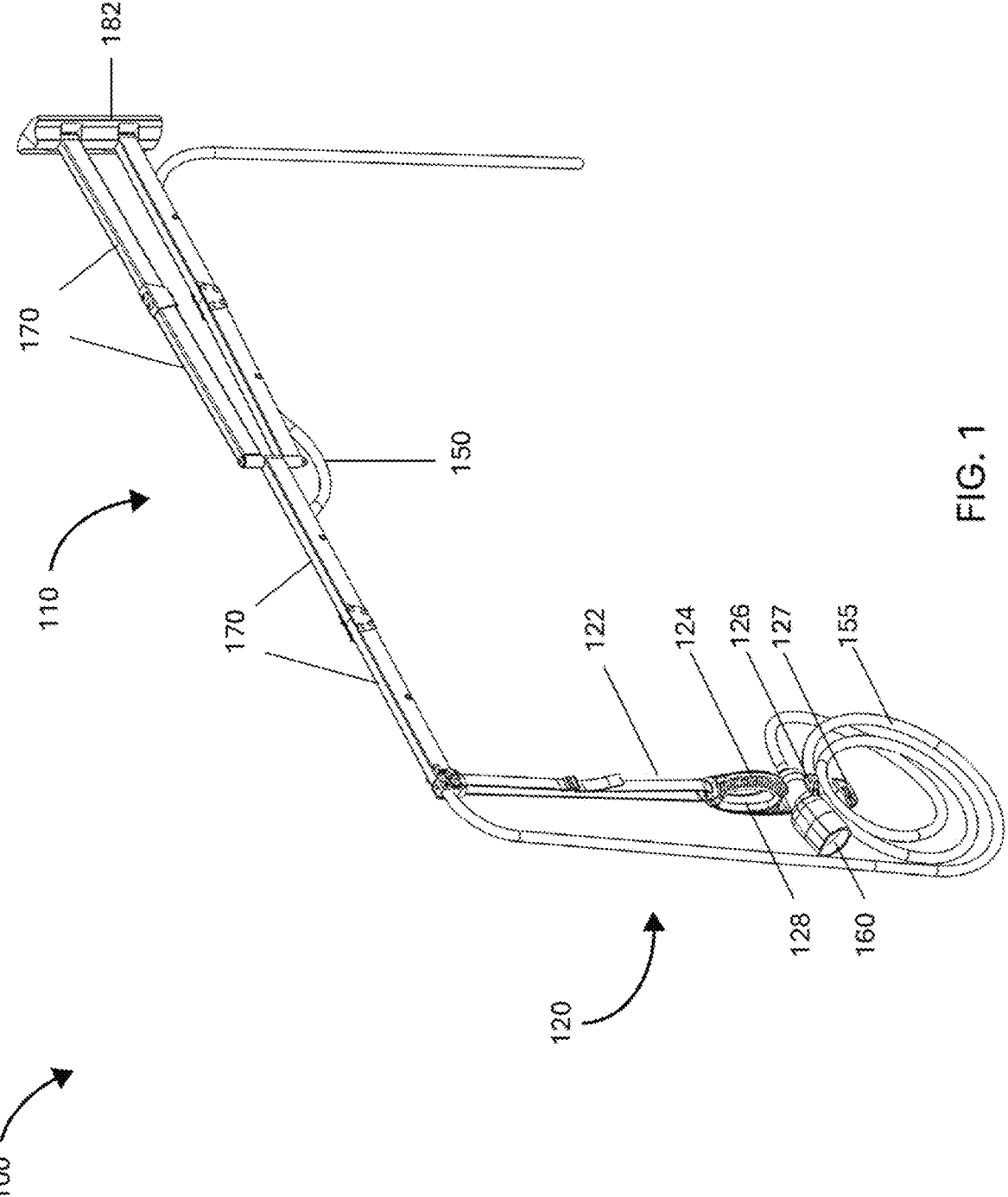
FIG. 1 is a schematic illustration of a modular cable support arm system, according to an embodiment of the disclosure.

FIG. 1 is a schematic illustration of a modular cable support arm system 100, according to an embodiment of the disclosure. In an embodiment of the disclosure, the modular cable support arm system 100 includes an arm 110 and a handle support 120. The arm 110 is provided to hold an electric charging cable 150 for charging a vehicle, in the air above the user and/or the user's vehicle (e.g., at about 2-2.5 meters above ground) and position a charging handle 160 at a desired height to be plugged into the vehicle. The handle support 120 is provided for the user to grasp and move the arm 110, store the charging handle 160 at a desired height when not in use and hold a roll of excess cable 155 so that it is not left dangling on the floor.

In an embodiment of the disclosure, the arm 110 is made up from one or more rigid units 170 that are linked/connected to form a support of a selected length as described below. Optionally, the handle support 120 includes a strap 122, which enables adjusting the height for positioning a holder 124, which may include:

(I) a hand grasp 128 for the user to pull on the strap and position the arm 110;

(II) a socket 126 for holding the charging handle 160, when not deployed to charge a vehicle (e.g., plugged into the vehicle); and (III) a hook 127 to hang a roll of excess cable 155.

Figure 2:
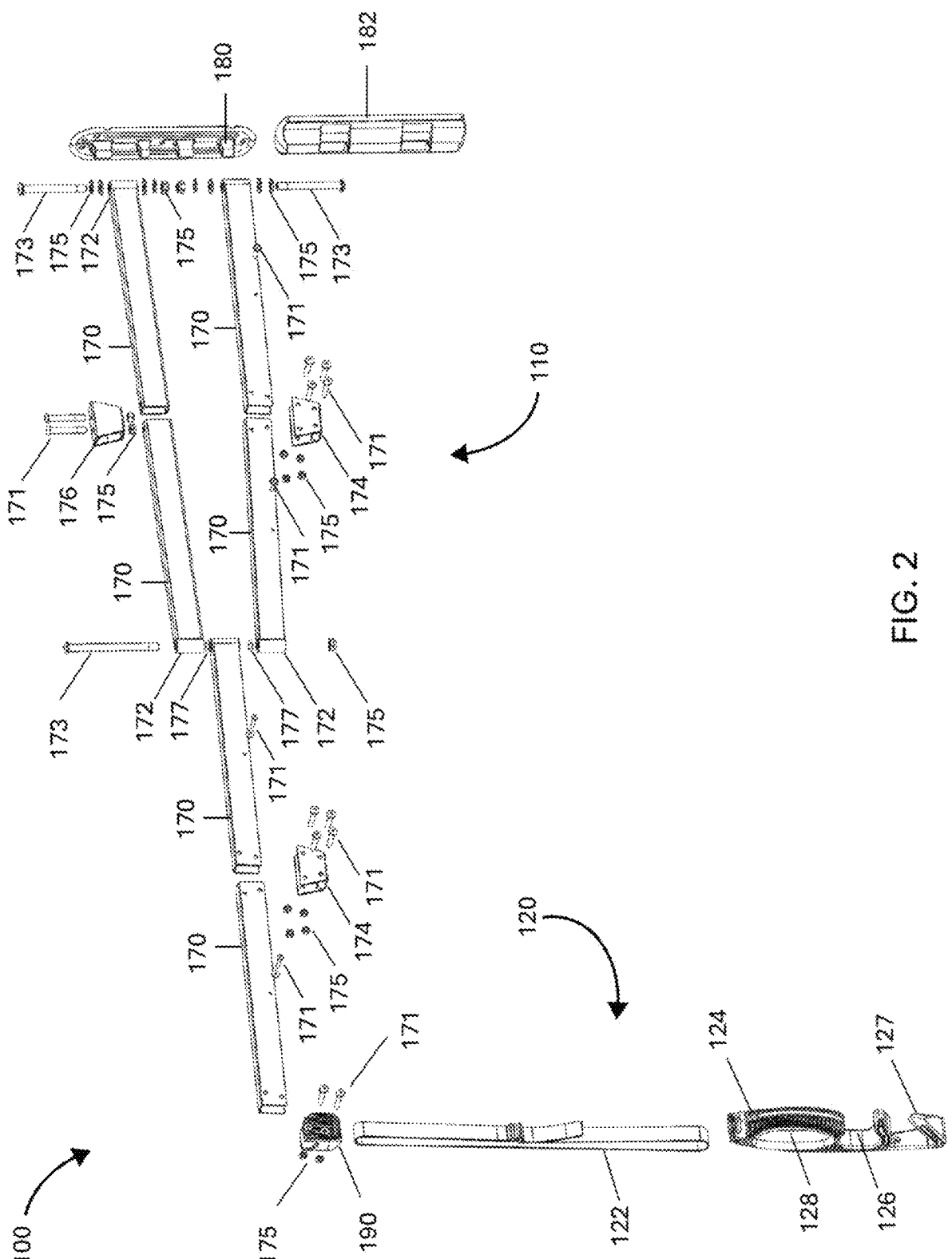
FIG. 2 is a schematic illustration of an exploded view of a modular cable support arm system, according to an embodiment of the disclosure.

FIG. 2 is a schematic illustration of an exploded view of modular cable support arm system 100, according to an embodiment of the disclosure. In an embodiment of the disclosure, the arm 110 is made up from multiple rigid units 170. The rigid units 170 may be made from aluminum, steel, plastic or other rigid materials. The rigid units 170 may have a cross section that is U shaped (e.g., 470 in FIG. 4), to be lighter and easier to coat against corrosion (e.g., using zinc coating for steel) or may have a cross section that is rectangular shaped (e.g., 570 in FIG. 5) for enhanced strength. In some embodiments of the disclosure, a reinforcing unit 480 may be used with a U shaped unit 470 to enhance the strength of the rigid unit. Alternatively or additionally, the thickness of the rigid units 170 may be selected to enhance strength.

In an embodiment of the disclosure, the U shaped rigid unit 470 is selected to conceal the cable 150 within the U shaped rigid unit 470, to protect the cable 150 by keeping it out of sight within the rigid unit 170.

In an embodiment of the disclosure, rigid units 170 may be combined with connectors such as 172, 174 and/or 176 to form an elongated arm 110. Connecter 172 may be a cylindrical joint to rotatably attach further rigid units 170, connector 174 may be a trapezoid shaped connector facing upward and connector 176 may be a trapezoid shaped connector facing downward or a rectangular shaped connector (not shown) to extend the length of the arm 110 by forming elongated rigid units. Optionally, the connectors 172, 174, 176 may be connected to the rigid units 170 with nuts 175, bolts 171 and pins 173, wherein each type of connector 172, 174, 176 may have holes in different locations matching holes on the rigid unit 170. Screws, washers 177 and other elements may be added or used instead of the nuts 175 and bolts 171. In some embodiments of the disclosure, the connectors 172, 174, and/or 176 may be welded to the rigid units 170 to enhance strength. For example, in FIG. 2, connector 172 (a cylindrical joint) may be welded to the rigid units 170 for a more robust design. Optionally, pins 173 and/or nuts 175 are used with the cylindrical joint connectors 172 to rotatably connect between two rigid units 170. In some embodiments of the disclosure, the connector (e.g., 174) is open upward (e.g., U shaped) to support concealment of the cable 150 within the rigid units 170 that are U shaped facing downward (e.g., rigid units 470). Likewise, connector 176 may be opened downward (or not opened), connecting rigid units 170 that have a rectangular cross section (e.g., rigid units 570).

In an embodiment of the disclosure, a wall mount hinge 180 is provided to rotatably mount arm 110 onto a wall. Optionally, the wall mount hinge 180 may be covered by a wall mount cover 182 to protect the wall mount hinge 180. In an embodiment of the disclosure, a handle connector 190 may be used to connect between handle support 120 and a rigid unit 170 at an end of arm 110.

In some embodiments of the disclosure, arm 110 comprises a single sequence of rigid units 170 or especially for long arms 110, the arm 110 may include two or more sequences of rigid units 170 in parallel or slightly tilted relative to each other to enhance the strength of the arm 110. Optionally, half the arm may be a double sequence and half may be a single sequence such as shown in FIG. 1. In some embodiments of the disclosure, the arm 110 is initially attached to the wall with a double sequence of rigid units 170 and then extended with a single sequence of rigid units 170.

Figure 3:
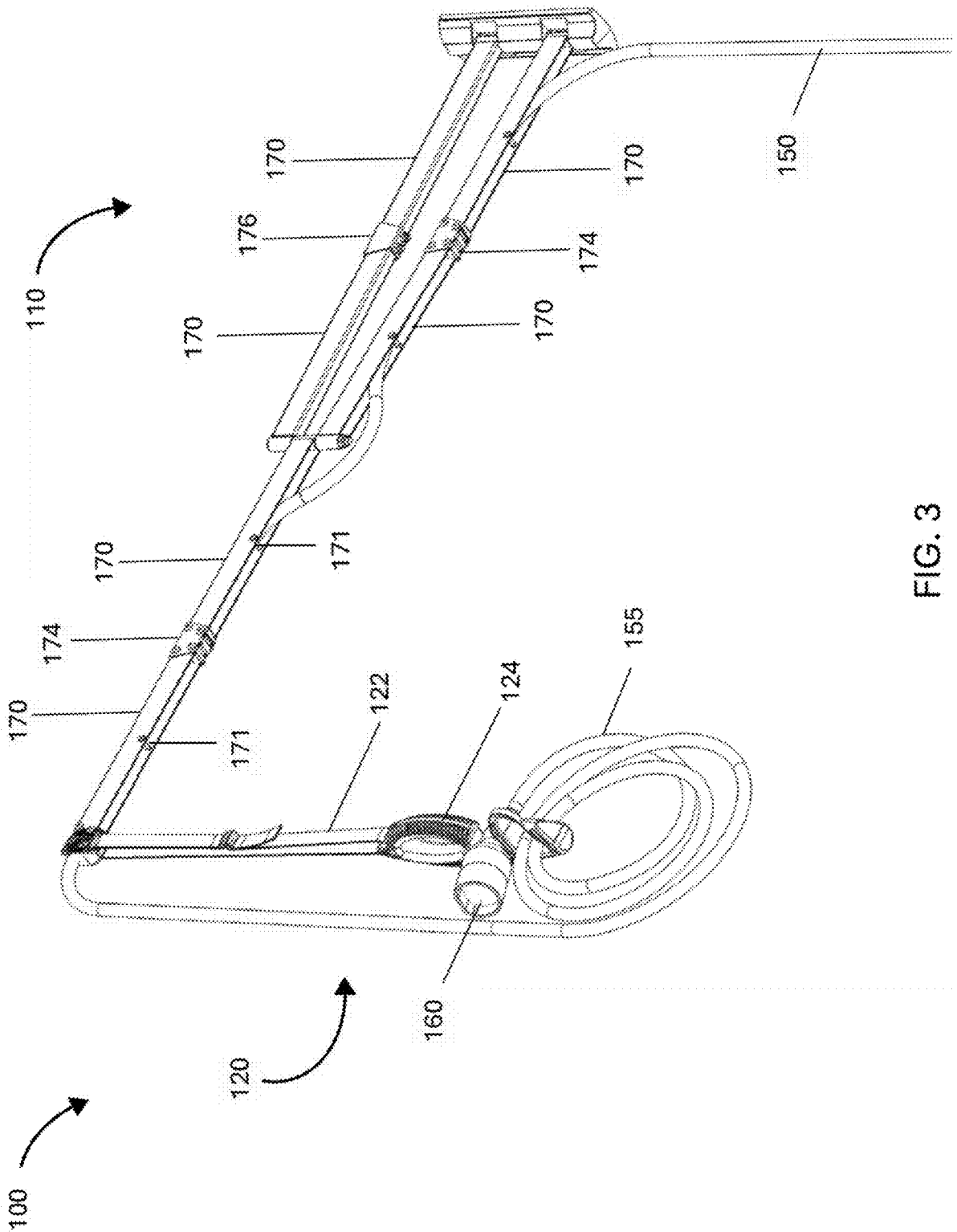
FIG. 3 is a schematic illustration of a perspective view of a modular cable support arm system from underneath, according to an embodiment of the disclosure.

FIG. 3 is a schematic illustration of a perspective view of a modular cable support arm system 100 from underneath, according to an embodiment of the disclosure. Optionally, cable 150 is inserted into a void formed by U shaped rigid units 170 and secured by the connectors (e.g., 174) and bolts 171, screws, dowels, wires or other elements to keep the cable 150 confined within the rigid units 170 and prevent the cable 150 from sagging or falling out. This option allows the user to position the cable 150 within the arm without removing charging handle 160 or disconnecting the cable 150 from the charging station/power source. Thus an electrician is not required to dismantle the cable and reconnect it but rather a non-professional user can easily install the arm 110 and deploy the cable 150.

In an embodiment of the disclosure, modular cable support arm system 100 is provided as a kit with a preselected amount of rigid units 170, connectors 172, 174, 176, 190 and other accessories (e.g., wall mount hinge 180, wall mount cover 182, nuts 175, bolts 171, pins 173). Optionally some of the rigid units may be pre-welded with cylindrical joints (connector 172) or other connecters. The kit is configured to form one or more specific configurations of arms 110. For example a specific kit may be used to form two or three different configurations. Some using all the provided parts and some only using part of the parts in the kit.

Optionally, the length of the rigid units 170 in the kit is selected to provide easy transport (e.g., in a standard car) and to easily store multiple kits on a standard store shelf, for example each rigid unit being less than 60 centimeters, half a meter, 45 centimeters or 40 centimeters. Long rigid units complicate storage and prevent users from collecting the kit by themselves. Additionally, many delivery companies place limits on the size of a package. Packages longer than a specific length (e.g., 45 centimeters) may significantly increase shipping costs.

Figure 4:
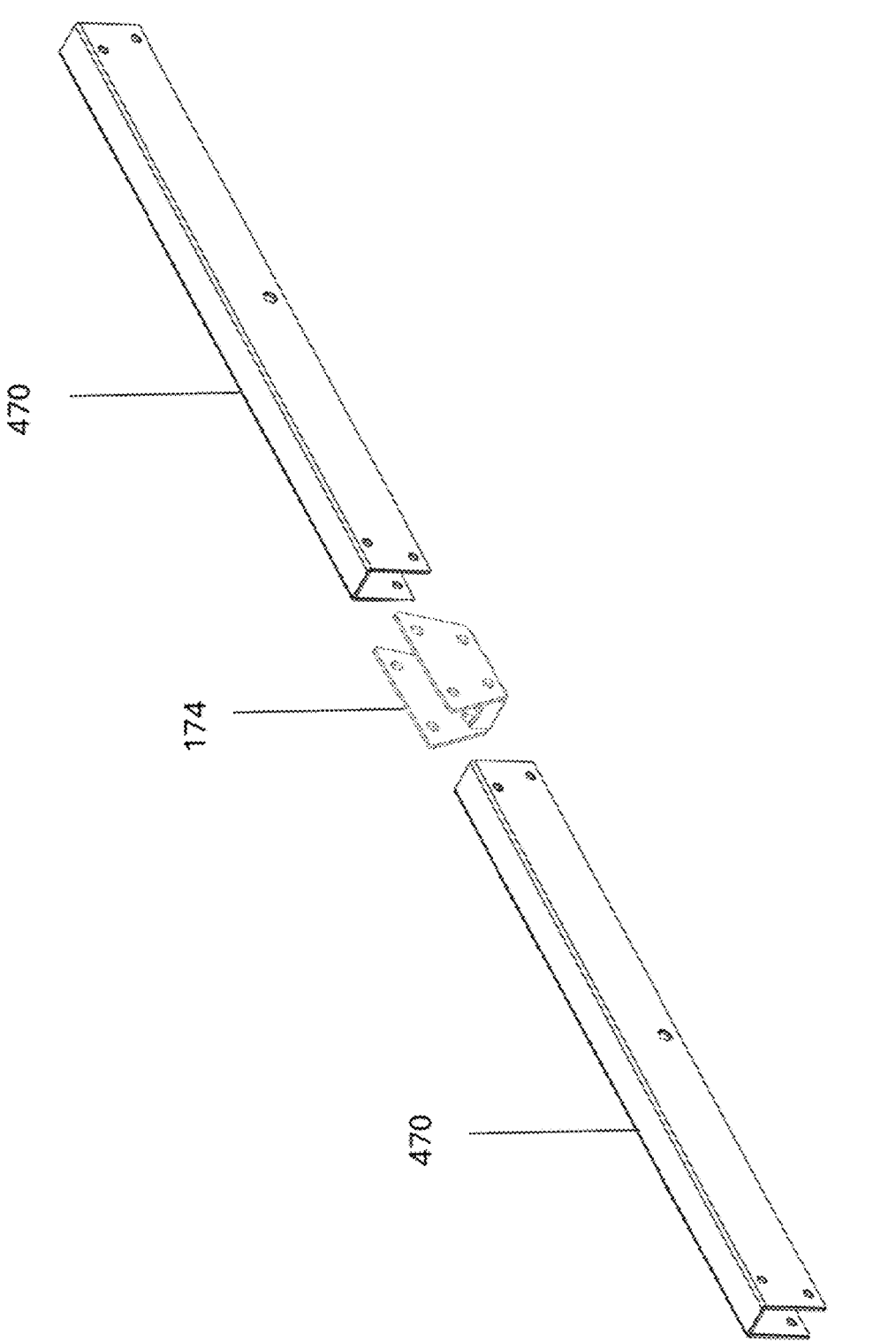
FIG. 4 is a schematic illustration of a U shaped rigid unit and a trapezoidal connector, according to an embodiment of the disclosure.
Figure 5:
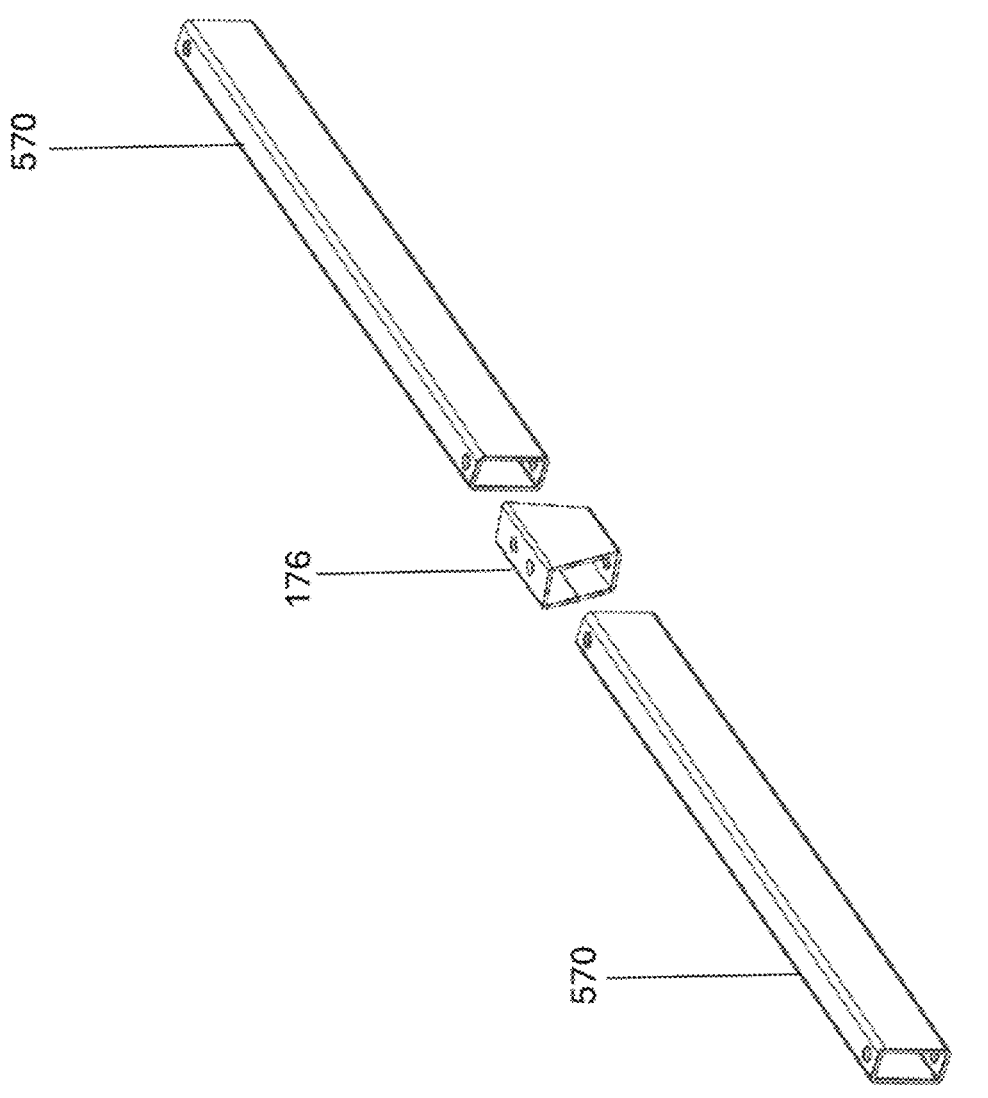
FIG. 5 is a schematic illustration of a rectangular shaped rigid unit and a rectangular connector, according to an embodiment of the disclosure.
Figure 6:
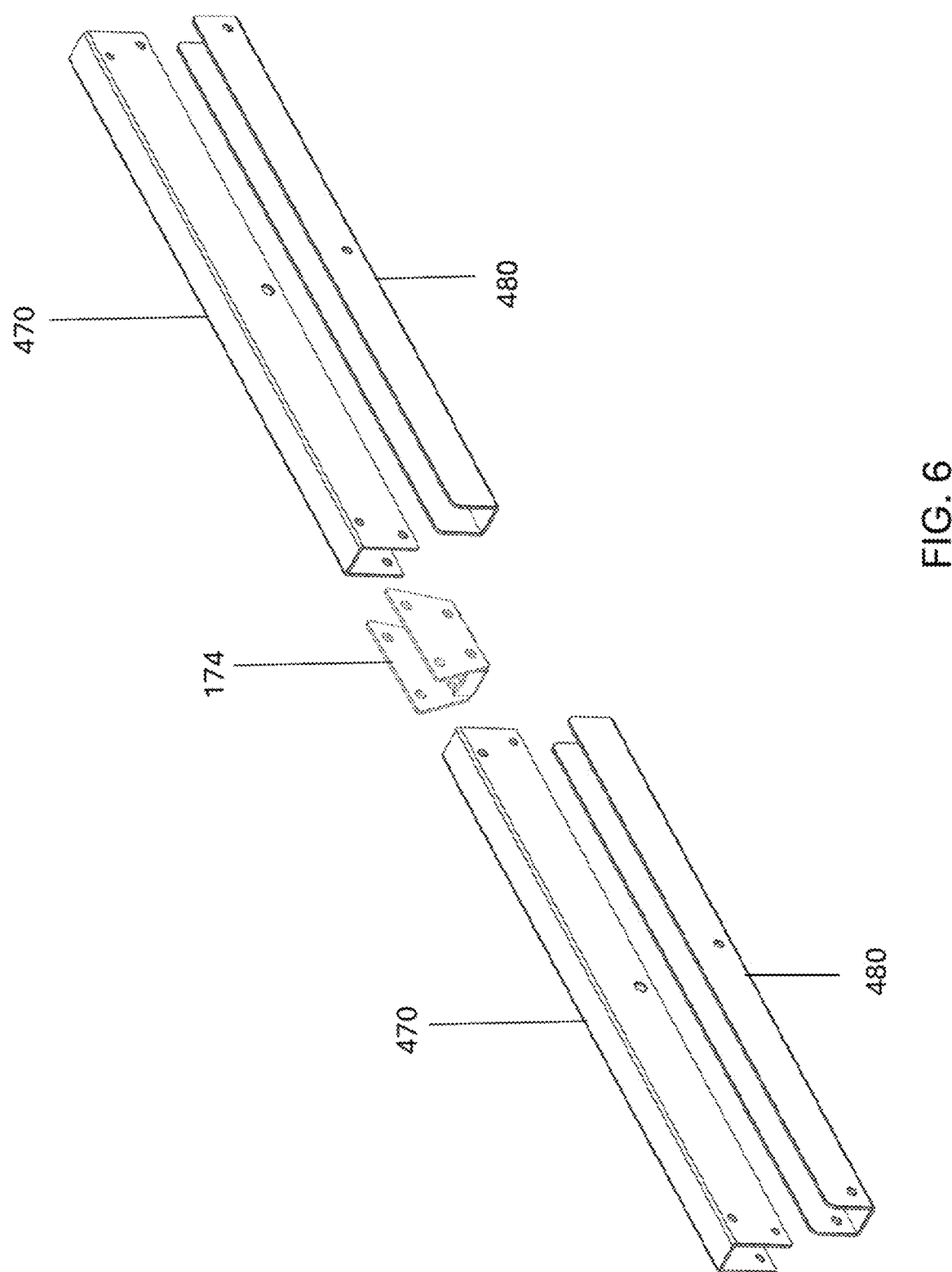
FIG. 6 is a schematic illustration of a U shaped rigid unit and a reinforcing unit, according to an embodiment of the disclosure.
Figure 7:
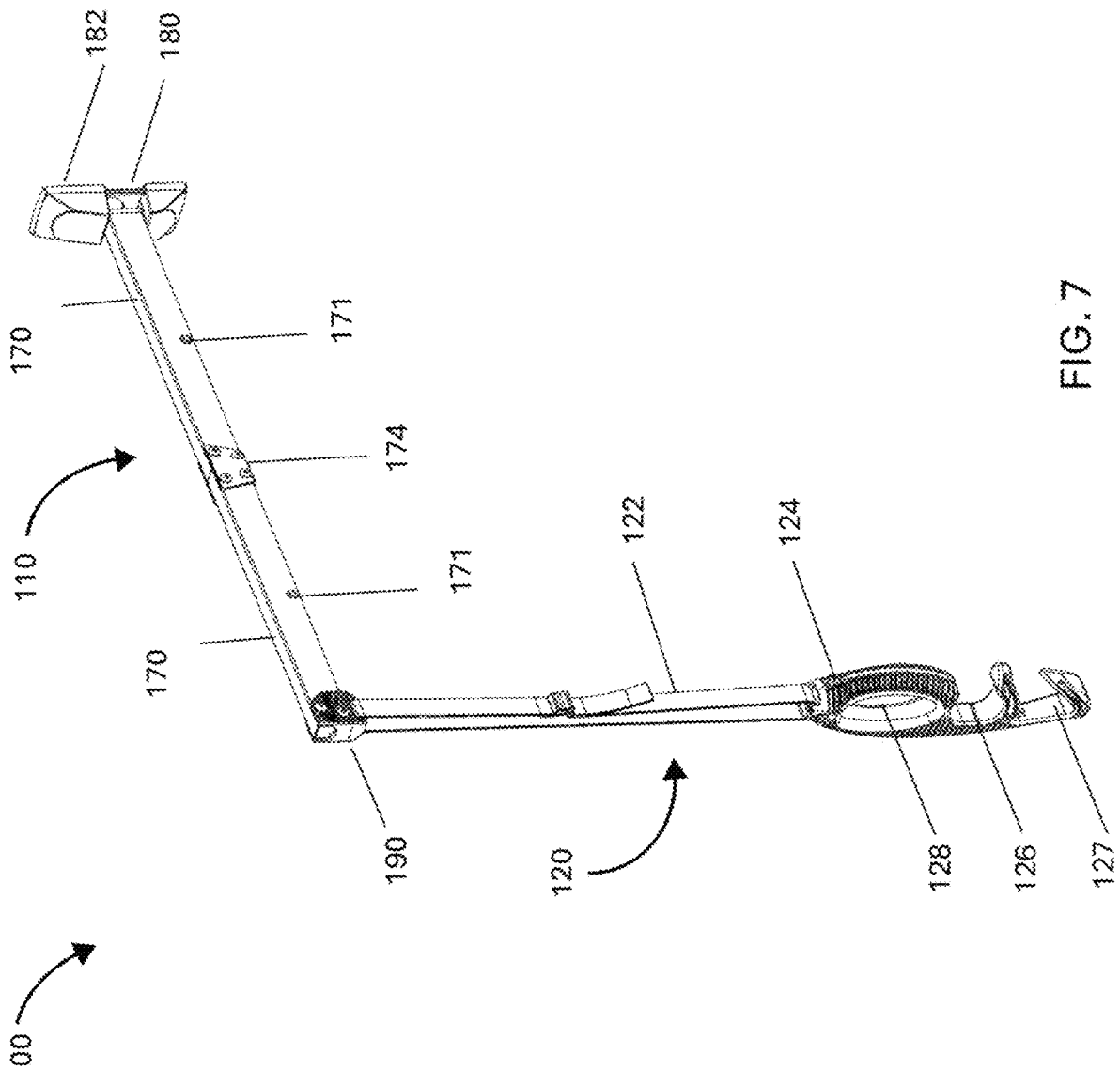
FIG. 7 is a schematic illustration of an alternative configuration of a modular cable support arm system, according to an embodiment of the disclosure.
Figure 8:
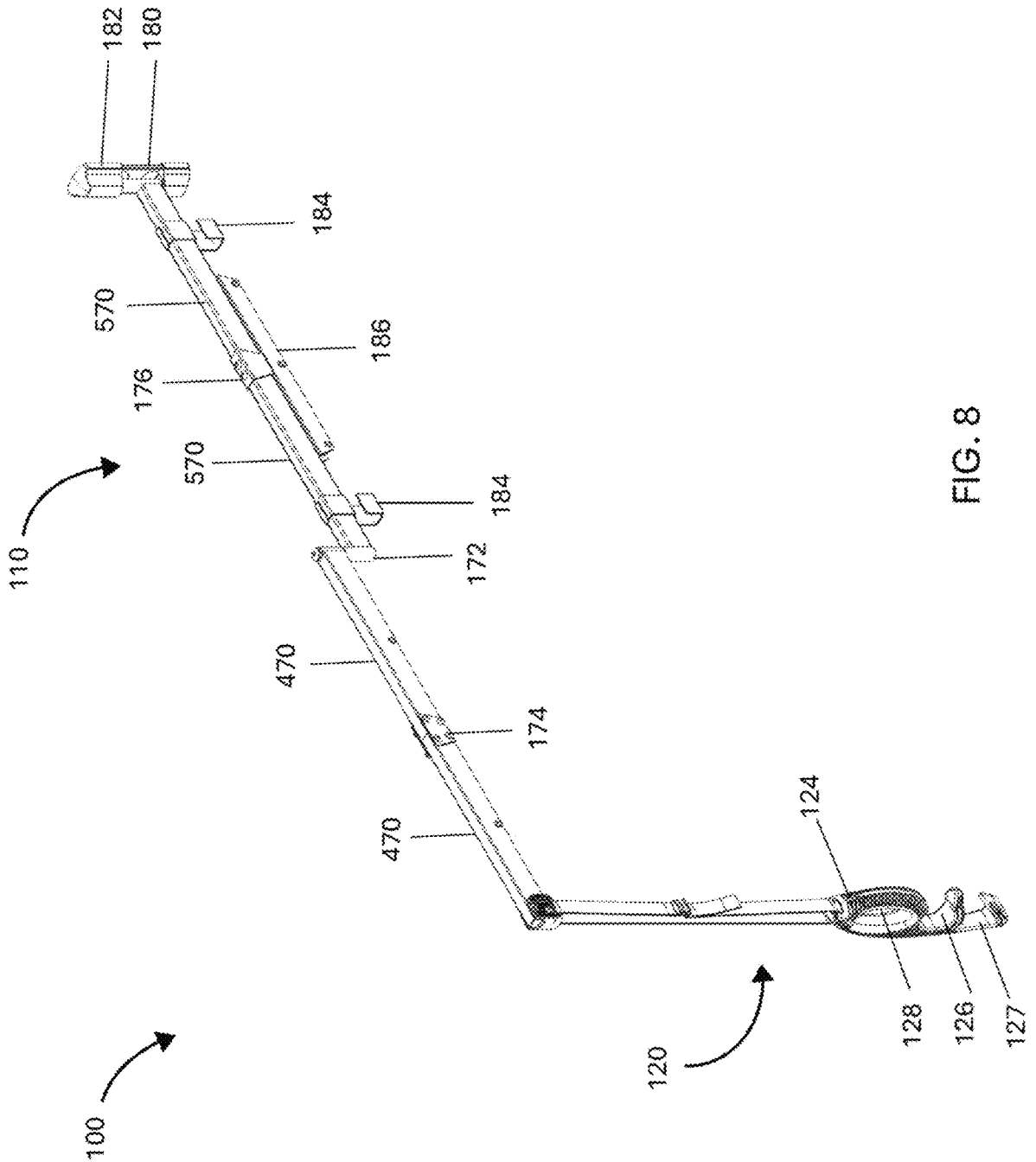
FIG. 8 is a schematic illustration of an additional alternative configuration of a modular cable support arm system, according to an embodiment of the disclosure.

FIG. 7 is a schematic illustration of an alternative configuration of a modular cable support arm system 100, and FIG. 8 is a schematic illustration of an additional alternative configuration of a modular cable support arm system 100, according to an embodiment of the disclosure. In an embodiment of the disclosure, the user may construct an arm 110 with a single sequence of rigid units 170 (U shaped units 470 or rectangular units 570), for example 2 units as depicted in FIG. 7 or 4 units as in FIG. 8 (or more units to extend the length of the arm system 100). Optionally, the arm 110 may only include a single rotatable joint at wall mount hinge 180, or may include one or more additional hinges by connecter 172 (e.g., a cylindrical joint) as in FIG. 8.

In some embodiments of the disclosure, as depicted in FIG. 8, the rigid units 170 extending from the wall mount hinge 180 until connector 172 (e.g., a cylindrical joint) are rectangular rigid units 570 to enhance the strength of the arm 110. In contrast the rigid units 170 extending from connector 172 are U shaped rigid units 470 since they are lighter and less robust having one less side.

In an embodiment of the disclosure, the arm 110 includes hooks 184 to hold cable 150, for example when using rigid units 170 in the form of rectangular rigid units 570 in which the cable cannot be concealed. In some embodiments of the disclosure, a U shaped cable holder 186 is attached to rectangular units 570 (e.g., with screws) to hold cable 150. Optionally, the cable is held in place by bolts 171 to conceal the cable 150 within the cable holder 186 and prevent it from falling downward.

Figure 9:
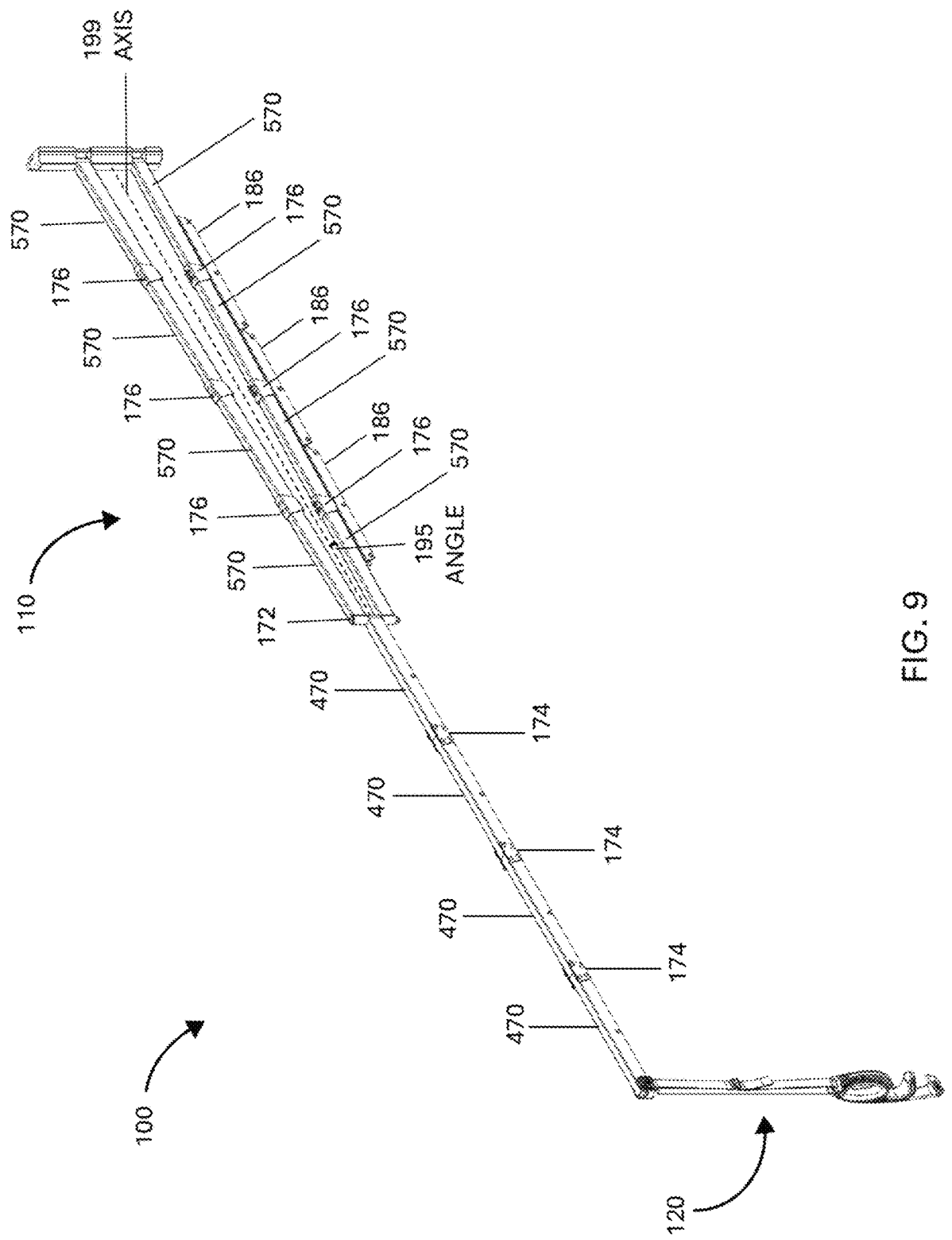
FIG. 9 is a schematic illustration of an alternative configuration of a modular cable support arm system 100, according to an embodiment of the disclosure.

FIG. 9 is a schematic illustration of an alternative configuration of a modular cable support arm system 100, according to an embodiment of the disclosure. In FIG. 9 two sequences of rigid units 170 are connected to wall mount hinge 180 to enhance the strength of the arm 110 to hold a rotatable extension extending from connecter 172. Optionally, each sequence includes 4 rigid units 170 (e.g., in the form of rectangular units 570, which are strengthened). one sequence tilts upward with an angle 195 relative to an axis 199 through the extension, and one tilts downward to balance the arm 110.

It should be appreciated that the above-described methods and apparatus may be varied in many ways, including omitting or adding elements or steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

I claim:

1. A modular cable support arm system, comprising:
two or more rigid units to form an arm to hold an electric charging cable;
a wall mount hinge to rotatably attach a first rigid unit to a wall;
a handle connector connected to a last rigid unit to attach a handle support to guide the arm to a desired location and hold a charging handle of the electric charging cable when not in use;
one or more connectors connecting the two or more rigid units together sequentially to form the arm;
wherein at least one of the two or more rigid units are U shaped having an opening facing downward to conceal the electric charging cable within the rigid unit and to hold the electric charging cable so that the electric charging cable does not need to be dismantled and inserted into the arm to be held by the arm.

2. The system of claim 1, wherein at least one connector of the one or more connectors connects two rigid units together non-rotatably to form an elongated rigid unit.

3. The system of claim 1, wherein a bolt, screw, dowel, wire or other element is inserted in U shaped rigid units to hold the electric charging cable within the rigid unit and prevent the electric charging cable from falling.

4. The system of claim 1, wherein reinforcing units are used to seal the opening of U shaped rigid units to enhance their strength and prevent the electric charging cable from falling.

5. The system of claim 1, wherein the handle support comprises a hand grasp to guide the arm to a desired location, a socket to hold the charging handle when not in use and a hook to hang a roll of excess cable of the electric charging cable.

6. The system of claim 1, wherein the arm comprises two sequences of rigid units between the wall mount hinge and the handle connector.

7. The system of claim 6, wherein the two sequences are parallel to each other.

8. The system of claim 6, wherein the two sequences tilt at an angle relative to each other.

9. The system of claim 1, wherein the arm comprises two sequences of rigid units from the wall mount hinge to one of the one or more connectors and a single sequence from the one of the one or more connectors to the handle connector.

10. The system of claim 9, wherein the single sequence is rotatably connected to the two sequences.

11. The system of claim 1, wherein some of the one or more connectors are welded to one of the rigid units that are connected by the connector.

12. The system of claim 1, wherein the system is provided as a kit with a specific amount of rigid units and connectors to form specific arm configurations.

13. The system of claim 1, wherein some of the two or more rigid units have a cross section that is rectangular shaped.

14. The system of claim 1, wherein the length of the two or more rigid units are less than 45 centimeters to reduce shipping costs.

15. The system of claim 1, wherein the arm includes at least two parts that are rotatably connected and each of the two parts includes a sequence of two rigid units that are non-rotatably connected.

16. The system of claim 1, wherein the arm includes at least two parts that are rotatably connected and each of the two parts includes a sequence of three or four rigid units that are non-rotatably connected.

* * * * *